(12) United States Patent
Duan et al.

(10) Patent No.: US 8,380,211 B2
(45) Date of Patent: Feb. 19, 2013

(54) CS DOMAIN CALL TERMINATING SYSTEM, METHOD AND NETWORK DEVICE

(75) Inventors: Xiaoqin Duan, Shenzhen (CN); Dongming Zhu, Shenzhen (CN); Hai Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 744 days.

(21) Appl. No.: 12/040,497

(22) Filed: Feb. 29, 2008

(65) Prior Publication Data

US 2008/0146220 A1 Jun. 19, 2008

Related U.S. Application Data

(63) Continuation of application No. PCT/CN2006/002224, filed on Aug. 30, 2006.

(30) Foreign Application Priority Data

Aug. 31, 2005 (CN) .......................... 2005 1 0093915

(51) Int. Cl.
*H04W 40/00* (2009.01)

(52) U.S. Cl. ...................................... 455/445; 455/461

(58) Field of Classification Search .................. 455/445, 455/432.1–433, 461; 379/221.08–221.14
See application file for complete search history.

(56) References Cited

U.S. PATENT DOCUMENTS

| | | | |
|---|---|---|---|
| 6,545,987 B1 * | 4/2003 | Becher | 370/328 |
| 6,567,667 B1 | 5/2003 | Gupta et al. | |
| 6,757,266 B1 | 6/2004 | Hundscheidt et al. | |
| 7,630,399 B2 | 12/2009 | Shang | |
| 2002/0196775 A1 | 12/2002 | Tuohino et al. | |
| 2004/0242227 A1 | 12/2004 | Huotari et al. | |
| 2005/0058125 A1 | 3/2005 | Mutikainen et al. | |
| 2006/0240820 A1 * | 10/2006 | Jiang | 455/432.1 |
| 2006/0280169 A1 * | 12/2006 | Mahdi | 370/352 |
| 2008/0146220 A1 | 6/2008 | Duan et al. | |

FOREIGN PATENT DOCUMENTS

| | | |
|---|---|---|
| CN | 1319313 | 10/2001 |
| CN | 1556643 A | 12/2004 |
| CN | 1581798 A | 2/2005 |
| CN | 100571468 C | 12/2009 |
| EP | 1217816 | 6/2002 |
| GB | 2398458 | 8/2004 |
| WO | WO 99/34635 | 7/1999 |

(Continued)

OTHER PUBLICATIONS

ETSI TS 129 002 V3.4.0 Technical Specification Digital cellular telecommunications system (Phase 2+) (GSM); Universal Mobile Telecommunications System (UMTS); Mobile Application Part (MAP) specification (3G TS 29.002 version 3.4.0 Release 1999), published in Mar. 2000, p. 148.*

(Continued)

*Primary Examiner* — Temica M Beamer
*Assistant Examiner* — Daniel Lai
(74) *Attorney, Agent, or Firm* — Slater & Matsil, L.L.P.

(57) ABSTRACT

A CS domain call terminating system, includes a routing-controlled determination module that determines a call which has been subject to routing control in accordance with information carried in a received call initiation message. The routing-controlled determination module sends routing-controlled information of the call to a subsequent call flow control module, and the subsequent call flow control module determines and executes a subsequent call flow of the call in accordance with the received routing-controlled information. A network entity can obtain the routing-controlled information of the call during CS domain call termination of the invention, thereby avoiding repeated routing control and an indefinite subsequent call flow in the CS domain call terminating flow.

13 Claims, 6 Drawing Sheets

FOREIGN PATENT DOCUMENTS

WO      WO 01/20925 A2    3/2001

OTHER PUBLICATIONS

Digital cellular telecommunications system (Phase 2+); Support of Optimal Routeing (SOR); Technical realisation (GSM 03.79 version 7.3.0 Release 1998, dated Jun. 2000).*

"3rd Generation Partnership Project; Technical Specification Group Core Network and Terminals; IP Multimedia (IM) Subsystem Cx and Dx interfaces; Signalling flows and message contents (Release 6)," 3GPP TS 29.228, V6.7.0, Jun. 2005, 54 pages.

"3rd Generation Partnership Project; Technical Specification Group Services and Systems Aspects; Network architecture (Release 6)," 3GPP TS 23.002, V6.8.0, Jun. 2005, 59 pages.

"3rd Generation Partnership Project; Technical Specification Group Core Network and Terminals; Mobile Application Part (MAP) specification; (Release 7)," 3GPP TS 29.002, V7.0.0, Jun. 2005, 1273 pages.

PCT Written Opinion of the International Searching Authority for PCT/CN2006/002224, Dec. 28, 2006, Applicant: Huawei Technologies Co., Ltd., et al., 3 pages.

Supplemental European Search Report for EP Patent Application No. 06775541.3-2416, Jul. 31, 2008, Applicant: Huawei Technologies Co., Ltd., 7 pages.

Communication pursuant to Article 94(3) EPC, EP Patent Application No. 06775541.3-2416, Nov. 11, 2008, Applicant: Huawei Technologies Co., Ltd., 5 pages.

Communication pursuant to Article 94(3) EPC, EP Patent Application No. 06775541.3-2416, Feb. 12, 2010, Applicant: Huawei Technologies Co., Ltd., 3 pages.

Communication under Rule 71(3) EPC, EP Patent Application No. 06775541.3-2416, Jul. 2, 2010, Applicant: Huawei Technologies Co., Ltd., 5 pages.

"3rd Generation Partnership Project; Technical Specification Group Services and System Aspects; Voice Call Continuity between CS and IMS Study (Release 7)". Retrieved on Jul. 1, 2008 from: http://www.3gpp.org/FTP/Specs/html-info/23806.htm.

European Search Report, European Application No. 10172687.5-2416, Applicant: Huawei Technologies Co., Ltd., Dated: Sep. 22, 2010, 6 pages.

Statement of Responses for Invalidation Declaration and partial translation, received from Chinese Patent Office, mailed Mar. 14, 2012, 17 pages.

3rd Generation Partnership Project, "Technical Specification Group Services and System Aspects; Voice Call Continuity Between CS and IMS Study (Release 7)," 3GPP TR 23.806, v1.3.0, Aug. 2005, 18 pages.

* cited by examiner

Figure 6

CS DOMAIN CALL TERMINATING SYSTEM, METHOD AND NETWORK DEVICE

CROSS REFERENCE TO RELATED APPLICATIONS

This application is a Continuation of PCT/CN2006/002224 filed Aug. 30, 2006, and claims the benefit of Chinese Patent Application No. 200510093915.2 filed on Aug. 31, 2005, both of which are incorporated by reference herein. The PCT application published in Chinese as WO2007/025473 A1.

FIELD OF THE INVENTION

The present invention relates to the field of communication technologies, particularly to a Circuit Switch (CS) domain call terminating system, method and network device.

BACKGROUND OF THE INVENTION

The core network of Universal Mobile Telecommunications System (UMTS) is divided into subsystems of Circuit Switch, Packet Switch (PS) and IP Multimedia System (IMS) since the stage of the 3rd Generation Partnership Project (3GPP) R5.

The IMS architecture defined in 3GPP standards addresses comprehensively crucial operatability issues, such as roam charging, Quality of Service (QoS) and security guarantee, required to be solved for provision of multimedia services over an IP bearer, and its architecture and idea have been accepted commonly in the industry. Both the 3GPP2 and the TISPAN define the respective IP multimedia network architectures and service systems with the 3GPP model as a basis and reference. The 3GPP has been in the research of projects regarding interworking of UMTS via Wireless Local Area Network (WLAN) access such as the Interworking of WLAN (I-WLAN), fixed broadband access to IMS such as the Fixed Broadband access to IMS (FBI), various access technologies oriented all-IP network such as All-IP Network (AIPN), etc. A subscriber may have an access to the IMS via access networks on the basis of different access technologies by means of a single multimode User Equipment (UE) or different types of UEs in accordance with his/her subscription to obtain uniform multimedia services including a Voice over IP (VoIP) service and the like.

A service platform in the IMS architecture can also provide a voice service over IP, i.e. a VoIP service, and an operator can apply different charging rates to a CS domain voice service and an IMS domain voice service respectively. Therefore, for a call or session to be established, the route to the called subscriber in the CS domain or the IMS domain shall be selected in accordance with a routing policy of the operator and a preference setting of the subscriber. Further, because a CS domain voice service or an IMS domain voice service can also be provided by the operator in different regions respectively, continuity of an established call or session shall be ensured when the voice service switching between the CS domain and the IMS domain occurs to the subscriber due to mobility of the subscriber, so as to ensure a smooth transition of the voice service between the two different domains.

Currently, the 3GPP just approved a project for a research on the issue regarding service continuity between a CS call and a VoIP service provided by accessing to IMS via IP-Connectivity Access Network IP (IP-CAN), and the research focuses on routing control and switching for the called party.

The 3GPP currently proposes a call control solution of IMS control static anchoring to address the issue of switching between two domains such as the CS domain and the IMS domain. A core idea of the solution lies in that a call/session initiated from either the CS domain or the IMS domain is triggered to an Application Server (AS) in the IMS domain, and the AS performs anchoring control on the call/session. Thus, the AS controls subsequent switching of the anchored call/session regardless of subsequent occurrence of domain switching from the CS domain to the IMS domain or of domain switching from the IMS domain to the CS domain.

For the session control in the IMS, an anchoring point AS can be inserted conveniently in a call path to control a session, in other words, the session is triggered to the AS by definition of an initial Filter Criteria (iFC). For session control in the CS domain, it is not easy to insert an anchoring point AS in a call path. Therefore, for the purpose of triggering a call initiated from the CS domain to an anchoring point AS, the 3GPP specification has currently specified a plurality of solutions include that: for an initial call initiated with the CS domain being the calling party, in other words, for a call initiated from the calling party Visited Mobile Switching Center (VMSC) upon receipt of a call establishment message from a UE, the call can be routed to the anchoring point AS in two control modes including network side routing control, i.e. a scheme utilizing the Customized Applications for Mobile network Enhanced Logic (CAMEL), and user equipment side routing control, i.e. a scheme utilizing the Unstructured Supplementary Service Data (USSD) and Notify; and for an initial call initiated with the CS domain being the called party, i.e. a call initiated by a Gateway Mobile Switch Center (GMSC) in the home network of the called party in accordance with an analysis of information of the called party upon receipt of a call from the calling party, the call can be routed to the anchoring point AS with use of the CAMEL scheme and a signaling intercept scheme.

Such function of routing an initial call to another domain is referred to as a Domain Selection Function (DSF). In the CS domain, an entity with the DSF function can be a Global System for Mobile communications-Service Control Function (gsmSCF), and in the IMS domain, an entity with the DSF function can be an AS. The routing decision entity gsmSCF in the CS domain can be located in the same physical entity as the routing decision entity AS in the IMS domain.

A primary principle by which the anchoring control function in the AS described above implements domain switching lies in that: in initial establishment of a call, a UE (A), for example, initiates a call to a UE (B), a gsmSCF or an AS with the DSF function inserts an anchoring point AS in a call path of the calling party UE (A), and the anchoring point AS enables a Back to Back User Agent (B2BUA) function to divide the call of the calling party into two segments, an AS terminated segment and an AS initiated segment. The AS terminated segment is a call segment between the UE (A) and the anchoring point AS, and the AS initiated segment is a call segment between the anchoring point AS and the UE (B). Subsequently during the call, when detecting that a domain switching condition is satisfied, a UE (A') desires to switch the ongoing call from the UE (A) to the UE (A') for subsequent control on the call, and at this time, the UE (A') initiates a new call for the AS performing anchoring control on the current call. The AS receives the call and determines that domain switching is required, and connects the call newly initiated by the UE (A') to the AS initiated segment and then releases the call of the AS terminated segment. Thus, under the control of the anchoring point AS, the call is connected for the UE (A') and the UE (B), and the previous call segment between the UE (A) and the AS is released, thereby accomplishing switching from the UE (A) to the UE (A'). Such function of performing anchoring control on a call and switching of the call upon occurrence of domain switching is referred to as Domain Transfer Function (DTF), and in the static anchoring point solution, an entity with the DTF function is an AS in the IMS domain. The routing decision point gsmSCF or AS with the DSF function can be located in the same physical entity as the AS with the DTF function.

Here, the UE (A) can be a CS domain User Equipment, the UE (A') can be an IMS domain User Equipment, and call continuity of the call of the subscriber A from the CS domain to the IMS domain can be achieved by call switching from the UE (A) to the UE (A').

Alike, in initial establishment of a call, an anchoring point AS can be inserted in a call path of the called party UE (B) to implement call control on subsequent domain switching of the called party In the currently proposed call control solution of an IMS control static anchoring point, the AS with the DTF function has performed anchoring control on the present call/session, in other words, when the B2BUA function is enabled, both a status of the call terminated at the DTF and a status of the session newly initiated at the DTF are maintained at the DTF to control domain switching which may possibly be initiated by the subscriber subsequently. However, when the GMSC retrieves T-CSI from an HLR and sends again an Initial Detection Point (IDP) message to the gsmSCF with the DSF function to request a routing indication from the DSP, the IDP message carries a real called number MSISDN because the information of the called party has been recovered at the GMSC into the real called number MSISDN. Thus, in subsequent steps, the DSF can not determine whether routing control has been performed on the call in accordance with the called number MSISDN in the received IDP message, in other words, the DSF can not determine whether the present call has been routed to the IMS domain for anchoring control, resulting in repeated routing control which occurs in a subsequent call flow, so that the call can not be switched normally in the CS domain.

SUMMARY OF THE INVENTION

An object of the invention is to provide a CS domain call terminating system, method and network device, which avoids repeated routing control in a CS domain call terminating flow through transmission of routing-controlled information, i.e. information indicating that a call has been subject to routing control, to enable a call to be connected normally in the CS domain, thereby achieving the purposes of improving the CS domain call terminating flow and enhancing feasibility of the across-domain call.

A CS domain call terminating system includes:
a routing-controlled determination module adapted to determine a call which has been subject to routing control in accordance with information carried in a received call initiation message, and to provide a subsequent call flow control module with routing-controlled information of the call where the subsequent call flow control module is adapted to determine and execute a subsequent call flow of the call in accordance with the received routing-controlled information.

The following additional aspects of the system are optional:
(1) The information carried in the call initiation message includes a CS domain Routing Number (CSRN).
(2) The routing-controlled determination module is located in a network entity for CS domain interworking.
(3) The subsequent call flow control module includes a routing decision sub-module and an execution sub-module.
(4) The routing decision sub-module is adapted to determine that the present call has been subject to routing control upon receipt of an IDP message carrying the routing-controlled information, and to issue a Continue message directly to the network entity for CS domain interworking without executing a routing decision policy, and
the execution sub-module is adapted to send to an HLR a Sending Routing Information (SRI) message carrying a suppress Terminating-CAMEL Subscription Information (T-CSI) parameter upon receipt of the Continue message, and to route the call to a VMSC for a called subscriber for connecting in accordance with routing information for the called subscriber, a Mobile Station Roaming Number (MSRN), returned from the Home Location Register (HLR).
(5) The routing decision sub-module is located in a gsmSCF with a domain routing selection function.
(6) The execution sub-module is located in a network entity for CS domain interworking.
(7) The subsequent call flow control module includes a routing information obtainment sub-module and a call routing sub-module.
(8) The routing information obtainment sub-module is adapted to obtain number information of the original called subscriber by parsing a CSRN carried in the call initiation message upon receipt of the routing-controlled information from the routing-controlled determination module, and send to an HLR an SRI message carrying a suppress T-CSI parameter in accordance with the number information of the original called subscriber, and send, upon receipt of routing information for the called subscriber returned from the HLR, the routing information to the call routing sub-module, and
the call routing sub-module is adapted to route the call to a VMSC for the called subscriber in accordance with the routing information sent from the routing information obtainment sub-module.
(9) The routing information obtainment sub-module is located in a network entity for CS domain interworking.
(10) The call routing sub-module is located in a network entity for CS domain interworking.
(11) The network entity for CS domain interworking includes a Gateway Mobile Switch Center (GMSC) or a Media Gateway Control Function (MGCF) with the function of a GMSC.

The invention further includes a CS domain call terminating method, including:
a. determining, by a routing-controlled determination module, a call which has been subject to routing control in accordance with information carried in a received call initiation message;
b. sending, by the routing-controlled determination module, routing-controlled information of the call to a subsequent call flow control module; and
c. executing, by the subsequent call flow control module, a subsequent call flow of the call in accordance with the received routing-controlled information.

The following additional aspects of the method are optional:
(1) The routing-controlled determination module is located in a network entity for CS domain interworking, and the step a includes:
receiving, by the network entity for CS domain interworking, the call initiation message, and determining that the call has been subject to routing control in accordance with a CSRN carried in the call initiation message.
(2) A routing decision sub-module and an execution sub-module of the subsequent call flow control module are located respectively in a gsmSCF with a domain routing selection function and a network entity with for CS domain interworking, and the step b includes:

carrying, by the network entity for CS domain interworking, the routing-controlled information of the call in a predetermined message, so that the routing-controlled information of the call is sent to the gsmSCF with the domain routing selection function.

(3) The step b of the method includes the step of:

carrying, by the network entity for CS domain interworking, a CSRN in the call initiation message in an IDP message, so that the CSRN is sent to the gsmSCF with the domain routing selection function.

(4) The step c of the method includes the step of:

issuing, by the gsmSCF with the domain routing selection function, a Continue message to the network entity for CS domain interworking in accordance with the routing-controlled information in the received predetermined message, and sending, by the network entity for CS domain interworking, to an HLR an SRI message carrying a suppress T-CSI parameter upon receipt of the Continue message, and routing the call to a VMSC for a called subscriber in accordance with routing information for the called subscriber returned from the HLR.

(5) The subsequent call flow control module is located in a network entity for CS domain interworking, and the step c of the method includes the step of:

sending, by the network entity for CS domain interworking, to an HLR an SRI message carrying a suppress T-CSI parameter in accordance with the routing-controlled information, and routing the call to the VMSC for the called subscriber in accordance with routing information returned from the HLR.

(6) The call is one determined, by a gsmSCF with a domain routing selection function or an Application Server with the domain routing selection function after performing routing control, as required to be connected in the CS domain.

(7) The routing control further includes routing control based upon static anchoring switching.

(8) The invention also provides a network device, including: a routing-controlled determination module adapted to determine a call which has been subject to routing control in accordance with information carried in a received call initiation message, and sending routing-controlled information of the call, and a subsequent call flow control module adapted to enable the network device in a subsequent call flow of the call to determine and execute the subsequent call flow in accordance with the received routing-controlled information.

(9) The routing-controlled determination module is located in a network entity for CS domain interworking.

As can be seen from the above descriptions of the solutions that in the invention, by determining a call/session which has been subject to routing control and providing routing-controlled information, a network entity in a CS domain call terminating flow is allowed to obtain the routing-controlled information of the call, thereby avoiding the phenomenon of repeated routing control and an indefinite subsequent call flow in the CS domain call terminating flow. The application of the invention in a static anchoring solution for the issue of call continuity makes a CS domain call terminating flow in the static anchoring solution become definite, in this case, when the routing-controlled information such as a CSRN is carried in an IDP message by a network entity for CS domain interworking such as a GMSC and sent to a network entity with a domain routing selection function such as a gsmSCF with the DSF function, the gsmSCF with the DSF function issues a Continue message, for example, in accordance with the CSRN in the IDP message so as to enable a subsequent call flow to be handled properly and the call to be connected normally in the CS domain; and when a network entity for CS domain interworking such as a GMSC determines in accordance with a received Initial Address Message (IAM) message that the present call has been subject to routing control by a network entity with a domain routing control function, such as a gsmSCF or an AS with the DSF function, the GMSC routes directly the call to a VMSC for the called subscriber, for example, so as to enable a subsequent call flow to be handled properly and the call to be connected normally in the CS domain, so that the solutions of the invention can achieve the purposes of improving the CS domain call terminating flow, enhancing feasibility of the across-domain call and increasing practicability of the static anchoring solution.

BRIEF DESCRIPTION OF THE DRAWINGS

The invention will become more readily apparent from the Detailed Description of the Invention, in which.

DETAILED DESCRIPTION OF THE INVENTION

The core of the system and method according to an embodiment of the invention lies in that a routing-controlled determination module determines a call which has been subject to routing control in accordance with information carried in a call initiation message sent by a routing control module, a routing-controlled information transmission module provides routing-controlled information of the call for a subsequent call flow control module, and the subsequent call flow control module determines and executes a subsequent call flow of the call in accordance with the received routing-controlled information.

The invention can be applied to various flows of CS domain call terminating based upon domain routing control. A call in the invention is one determined, by a gsmSCF with a domain routing selection function or an AS with the domain routing selection function after performing routing control, as required to be connected in the CS domain. The CS domain call terminating method and system according to an embodiment of the invention will be described further below by way of an example of a CS call terminating flow in which static anchoring is performed in the IMS domain on the basis of the core idea of the invention.

In a solution of static anchoring, a network entity for CS domain interworking in the invention can be a GMSC or an MGCF with the function of a GMSC, and an entity with the domain routing selection function can be a gsmSCF with the DSF function.

Regardless of whether an original called party of a call or session is in the CS domain or the IMS domain, if the AS with the DSF function determines, after performing routing control, that the call or session is required to be connected in the CS domain, the AS with the DSF function sends to a S-CSCF of the called party an INVITE message with a request-URI being a CSRN, the S-CSCF sends the INVITE message to the MGCF, which forwards the IAM message of the incoming call to the GMSC.

Upon receipt of the IAM message of the incoming call from the MGCF, the GMSC can determine that the call has been subject to routing control by the DSF provided that information of the called party in the IAM message is the CSRN, and at this time, the subsequent call flow can be carried out with two different processing methods.

In a first method, the GMSC sends routing-controlled information to the DSF, and the subsequent call flow is controlled by the DSF. An implementation thereof is as follows.

Firstly, the GMSC obtains an MSISDN of the original called subscriber through parsing the CSRN by means of an intelligent service or other conversion technologies, and sends an SRI message to the HLR on the basis of the resultant MSISDN, and the HLR returns a T-CSI of the called party, which indicates that the subscriber is a Voice Call Continuity (VCC) subscriber, in an SRI acknowledge message to the GMSC.

Here, the GMSC obtains the real MSISDN of the original called subscriber through parsing the CSRN by means of an intelligent service as follows: upon receipt of the IAM message with the called number being the CSRN, the GMSC triggers an intelligent service for the CSRN on the basis of Network CAMEL Service Information (N-CSI) configured beforehand at the GMSC, and sends to the gsmSCF with the DSF function an IDP message with the called number filled as the CSRN. The gsmSCF with the DSF function obtains the real called number MSISDN of the present call by parsing the called number CSRN in the IDP message, and then sends the resultant MSISDN to the GMSC by means of a CONNECT operation of intelligent network. Upon receipt of the CONNECT, the GMSC replaces the called number CSRN in the call with the MSISDN in accordance with the MSISDN in the CONNECT. Then, the GMSC sends an SRI to HLR/HSS to get the roam operation on the basis of the MSISDN.

Further, if the CSRN is constructed on the basis of information of the original called party, the GMSC can utilize a specific number conversion technology in accordance with the way in which the CSRN is constructed, so as to obtain the real number MSISDN of the original called subscriber by parsing the CSRN. For example, if the CSRN is constructed by adding a specific prefix to the real number MSISDN of the original called subscriber, then the GSMC removes the specific prefix to obtain the real number MSISDN of the original called subscriber.

On the basis of the obtained T-CSI, the GMSC sends again an IDP message to the gsmSCF with the DSF function, requesting a routing indication from the gsmSCF with the DSF function. The IDP message carries routing-controlled information which can be the information of the called party CSRN in the IAM message received by the GMSC or the Redirection ID CSRN in the CONNECT message received by the GMSC from the intelligent network service. The GMSC can carry the CSRN in a parameter of original called number information in the IDP message to the gsmSCF with the DSF function, to indicate that the present call has been subject to routing control. The gsmSCF with the DSF function can know which routing control was performed previously on the call by using the CSRN as an index, so as to determine a subsequent routing control process. Further, the routing-controlled information can also be an identification bit for simply indicating that the present call has been subject to routing control.

Thus, the gsmSCF with the DSF function may know that the call has been subject to routing control in accordance with the CSRN in the received IDP message. In other words, in the case of the static anchoring solution, the present call is one subjected to static anchoring control and thus is allocated to with no IMRN, and a Continue message is issued directly to the GMSC. Upon receipt of the Continue message, the GMSC proceeds with a subsequent call flow. In other words, the GMSC sends to the HLR an SRI for getting a roaming number, and the T-CSI is suppressed in this SRI. According to the roaming number, the GMSC routes the call to a VMSC for the called subscriber for connecting.

In the first method, a CS domain call terminating system includes a routing-controlled determination module and a subsequent call flow control module. The routing-controlled determination module is located in the GMSC, and the subsequent call flow control module includes a routing decision sub-module located in the gsmSCF with the DSF function and an execution sub-module located in the GMSC.

The routing-controlled determination module is primarily adapted to obtain, upon receipt of an IAM message carrying a CSRN, an MSISDN of an original called subscriber by parsing the CSRN, and send an SRI message to an HLR on the basis of the obtained MSISDN, and carry the CSRN in a parameter of original called number information in an IDP message to sends the CSRN to the subsequent call flow control module when obtaining the T-CSI of the called party, which is provided by the HLR in an SRI acknowledge message and indicates that the subscriber is a CS-IMS subscriber.

The routing decision sub-module is primarily adapted to determine, when the gsmSCF with the DSF function receives the IDP message carrying the CSRN, that the present call has been subject to routing control, and send a Continue message to the GMSC without executing any routing decision policy.

The execution sub-module is primarily adapted to execute, when the GMSC receives the Continue message issued by the gsmSCF with the DSF function, a Continue operation to proceed with a subsequent call flow, i.e. to send to the HLR an SRI for getting a roaming number, and T-CSI is suppressed in this SRI. According to the roaming number, the GMSC routes the call to a VMSC for the called subscriber for connecting.

Figure 1:
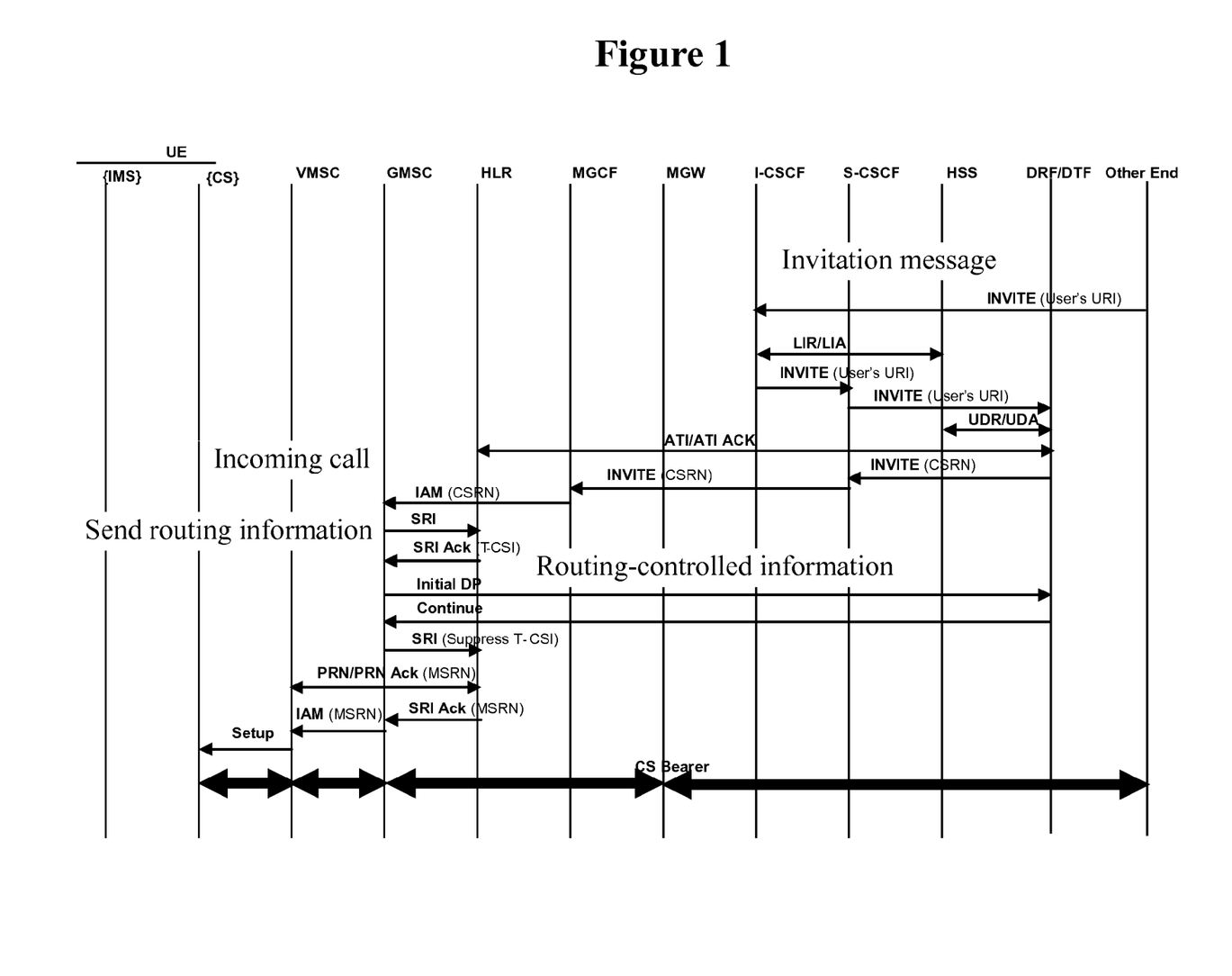
FIG. 1 is a first flow diagram of a method in which an S-CSCF of the called party in the IMS domain triggers an incoming session to an AS for anchoring through an iFC, with an IMS subscriber roaming in the CS domain acting as the called party, according to an embodiment of the invention.
Figure 2:
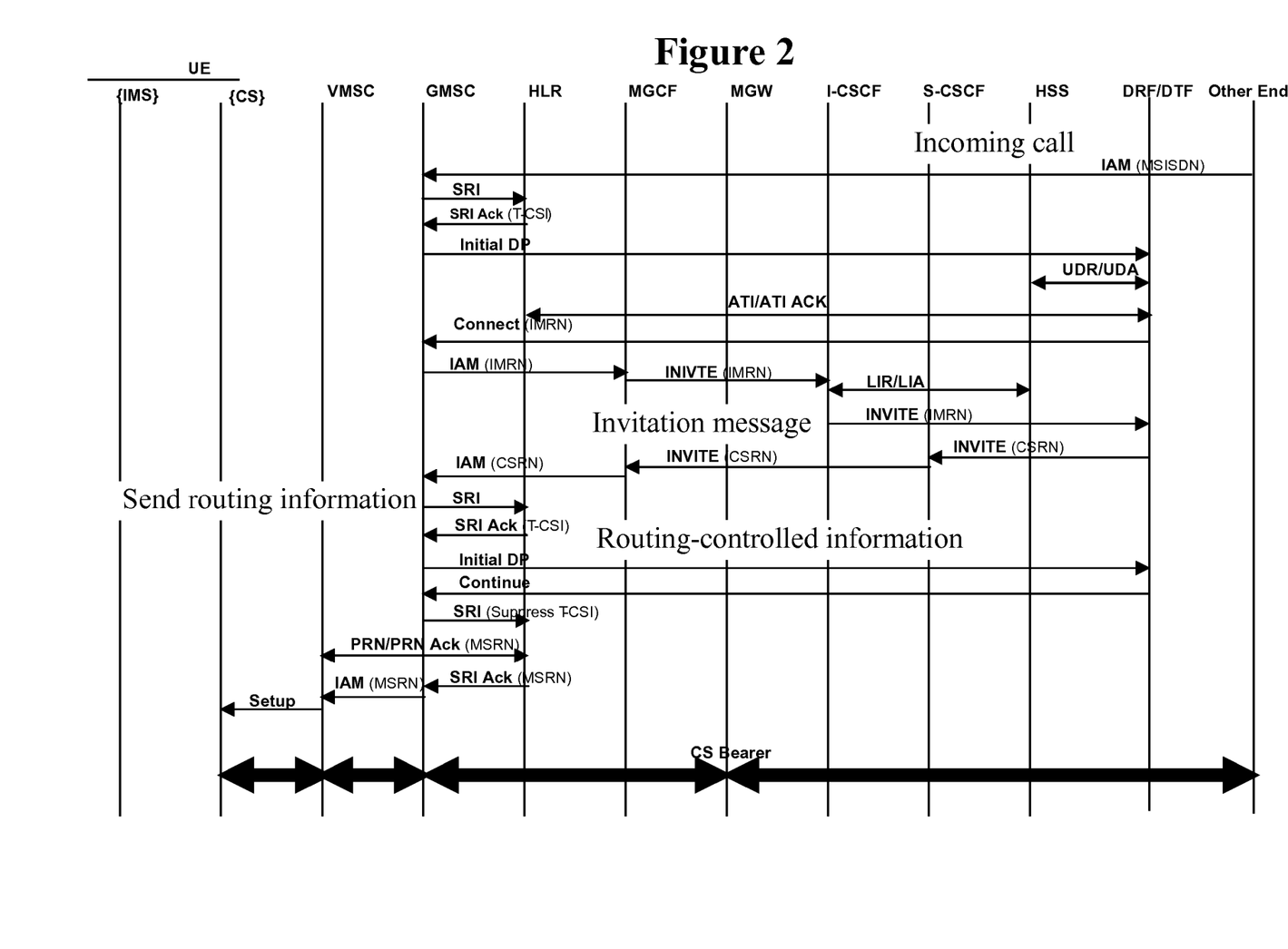
FIG. 2 is a first flow diagram of triggering a call received from the calling party to an anchoring point AS for anchoring by means of a CAMEL mechanism in the CS domain, with a CS domain subscriber acting as the called party, according to an embodiment of the invention.
Figure 3:
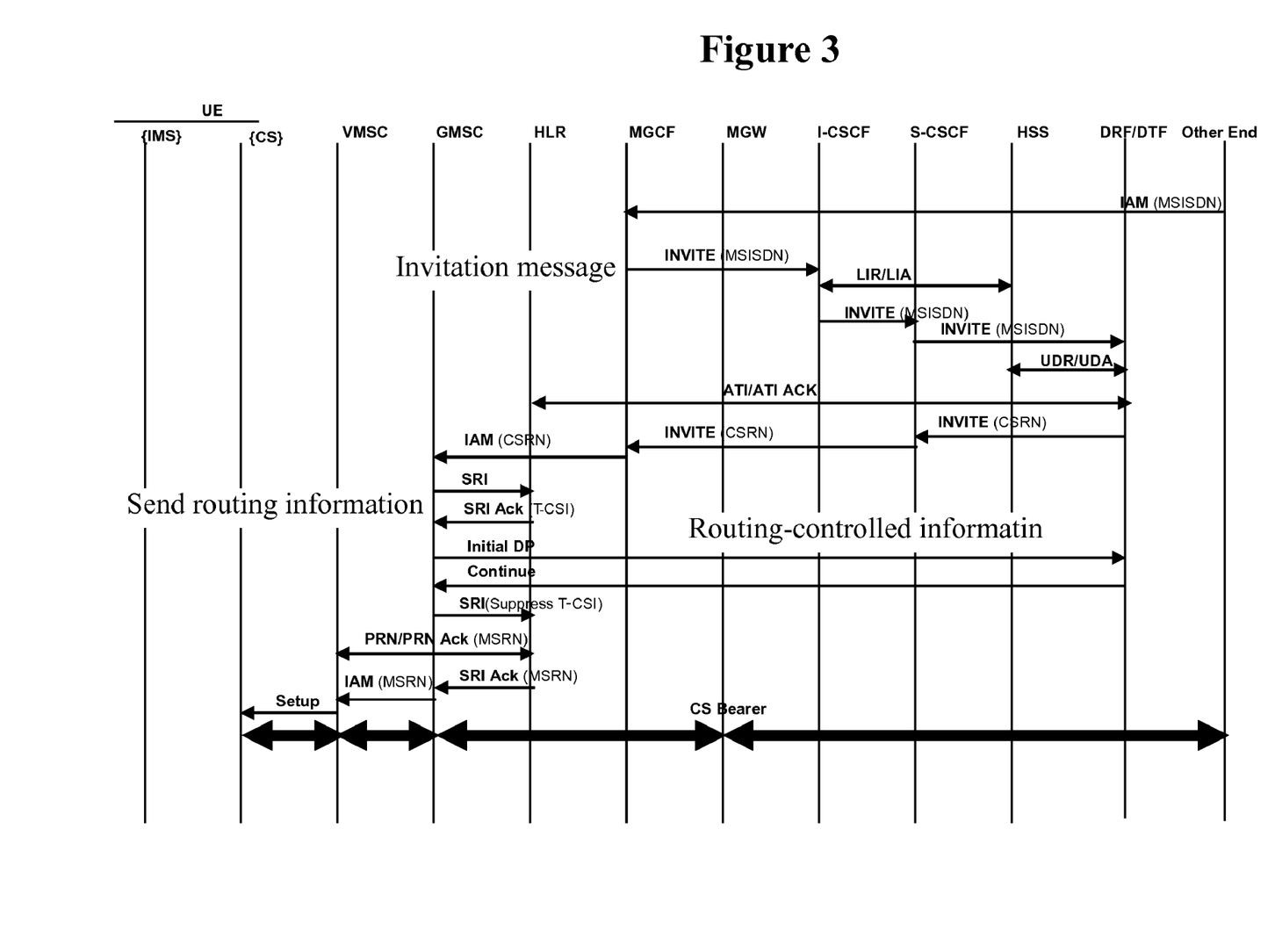
FIG. 3 is a first flow diagram illustrating that a call is routed to the IMS domain and triggered to an anchoring point AS for anchoring in accordance with an analysis of the called number in the CS domain or a PSTN network, with a CS domain or PSTN subscriber acting as the calling subscriber and an MSISDN subscriber in the IMS domain acting as the called subscriber, according to an embodiment of the invention.

An anchoring procedure of a CS call terminating flow in which the first method of the invention is integrated in the static anchoring solution is as illustrated in FIGS. 1-3.

A flow diagram illustrating that a calling subscriber in a IMS domain initiates a session to the called subscriber in the IMS domain and an S-CSCF of the called party in the IMS domain triggers the incoming session to an AS for anchoring through an iFC when the called subscriber from the IMS domain roams in the CS domain, according to the invention, is as illustrated in FIG. 1.

In FIG. 1, in the step 1-1, a session initiated from the IMS domain is routed to an Interrogating-Call Session Control Function (I-CSCF) in the home IMS domain of the called subscriber in accordance with information of the called party.

In the step 1-2, the I-CSCF interrogates a Home Subscriber Server (HSS) about routing information in accordance with a Request-URI in an INVITE message to obtain address information of the S-CSCF with which the subscriber has registered in the IMS domain.

In the step 1-3, the I-CSCF routes the session to the S-CSCF in accordance with the interrogation result. If the subscriber has not registered in the IMS domain currently, then the I-CSCF routes the session to an S-CSCF which is allocated temporarily for the unregistered subscriber.

In the step 1-4, the S-CSCF triggers the session to an AS with the DTF function in accordance with an iFC.

In the step 1-5, the AS with the DTF function performs anchoring control on the received session, in other words, the AS triggers the B2BUA function. In other words, the session received by the AS with the DTF function is terminated, and then a new session is initiated with respect to the information of the original called party, and the information of the called party Request-URI in the new session is a URI of the subscriber. Then, the session is triggered to an AS with the DSF function.

When the AS with the DTF function enables the B2BUA function, both a status of the session terminated at the DTF and a status of the session newly initiated at the DTF are maintained at the DTF to control domain switching which may possibly be initiated by the subscriber later.

In the step 1-6, the AS with the DSF function obtains the current registration status and data of the subscriber in the IMS domain from the HSS upon receipt of the call from the AS with the DTF function.

In the step 1-7, the AS with the DSF function obtains a current registration status and data of the subscriber in the CS domain from an HLR.

In the step 1-8, the AS with the DSF function performs a routing analysis on the information of the called party. Upon determination of that the session is required to be routed to the CS domain for connecting, the AS with the DSF function constructs a CSRN in TEL URI (which describes resources identified by telephone numbers) format, then modifies the Request-URI in the session as the CSRN and routes the session to the S-CSCF, and the S-CSCF routes the session to the original called party through an MGCF.

Here, in the construction of the CSRN, the DSF can construct the CSRN in the TEL URI format on the basis of information of the original called party or allocate dynamically an arbitrary CSRN.

Here, when the S-CSCF routes the session to the original called party, because the Request-URI in the session newly initiated from the AS with the DSF function is the CSRN, which can not be converted into SIP URI format by the S-CSCF through the function of ENUM DNS conversion, the S-CSCF routs the session to a Breakout Gateway Control Function (BGCF) in the same IMS domain as the S-CSCF, and the BGCF then routes the session to the GMSC in the CS domain through the MGCF.

In the step 1-9, upon receipt of the IAM message of the incoming call from the MGCF, the GMSC obtains an MSISDN of the original called subscriber through parsing the IAM message by means of a CAMEL service or other conversation technologies, and then the GMSC analyses the information of the called party on the basis of the obtained MSISDN and then sends an SRI message to the HLR to obtain routing information for the called subscriber. Because the GMSC supports the CAMEL capability, the SRI message sent by the GMSC to the HLR carries a parameter that indicates information on the support of CAMEL by the GMSC. The HLR returns a T-CSI of the called party, which indicates that the subscriber is a CS-IMS subscriber.

In the step 1-10, the GMSC triggers a CAMEL service in accordance with the received T-CSI and sends to the gsmSCF with the DSF function an IDP message to request a routing indication from the DSF. In this step, the GMSC needs to have the routing-controlled information, such as the CSRN in the received IAM message, carried in a parameter of original called number information of the IDP message and sent to the gsmSCF with the DSF function, so as to request a routing indication from the gsmSCF with the DSF function.

In the step 1-11, the gsmSCF with the DSF function determines that this call has been subject to routing control in accordance with the CSRN from information of original called address in the IDP message. In other words, for the static anchoring solution, this call is one subjected to static anchoring control and thus is allocated to without any IMRN, and a Continue message is issued directly to the GMSC. Upon receipt of the Continue message, the GMSC proceeds with the subsequent call, in other words, the GMSC sends an SRI message to the HLR to obtain the routing information for the called subscriber, here, this SRI message sent by the GMSC carries a suppress T-CSI parameter. Then, the GMSC routes the call to a VMSC for the called subscriber for connecting in accordance with the routing information for the called subscriber returned by the HLR.

A flow diagram of triggering a call received from the calling party to an anchoring point AS for anchoring by means of a CAMEL mechanism in the CS domain, with a CS domain subscriber acting as the called party, according to the invention is as illustrated in FIG. 2.

In FIG. 2, in the step 2-1, when an MSISDN from the information of the called party in a call belongs to the CS domain, the call initiated from the CS domain or a Public Switched Telephone Network (PSTN) is routed to the GMSC during routing for the called party.

In the step 2-2, the GMSC analyses the information of the called party upon receipt of the call from the calling party, and then sends an SRI message to the HLR to obtain routing information for the called subscriber. Because the GMSC supports the CAMEL capability, the SRI message sent by the GMSC to the HLR carries a parameter that indicates information on the support of CAMEL by the GMSC. The HLR returns the T-CSI of the called party, which indicates that the subscriber is a CS-IMS subscriber.

In the step 2-3, the GMSC triggers a CAMEL service in accordance with the received T-CSI and sends to the gsmSCF with the DSF function an IDP message to request a routing indication from the DSF.

In the step 2-4, the gsmSCF with the DSF function generates an IMS routing number (IMRN) which directs to an AS with a DTF function in the IMS domain, so that the GMSC routes the call to the DTF in according with the routing number. The gsmSCF with the DSF function can construct the IMRN by way of, for example, appending a call reference number to DTF identity information (i.e. DTF Public Service Identities (DTF PSI)), and the gsmSCF with the DSF function then issues the IMRN to the GMSC through a CAMEL Connect message.

In the step 2-5, the GMSC routes the call to the MGCF in the home IMS network of the called subscriber in accordance with the IMRN, and the GMSC have the routing for the call pass the I-CSCF in accordance with the IMRN.

The subsequent processing flow is the same as the steps 1-2 to 1-11 except that when the GMSC sends again an IDP message to the gsmSCF with the DSF function in the step 2-15 after the HLR returns in an SRI acknowledge message to the GMSC the T-CSI of the called party, which indicates that the subscriber is a CS-IMS subscriber, the GMSC needs to have the routing-controlled information, such as the CSRN in the received IAM message, carried in a parameter of original called number information of the IDP message to be sent to the gsmSCF with the DSF function, so as to request a routing indication from the gsmSCF with the DSF function.

In the step 2-16, the gsmSCF with the DSF function determines that the present call has been subject to routing control in accordance with the CSRN form original called address information in the IDP message. In other words, for the static anchoring solution, the present call is one subjected to static anchoring control and thus is allocated to without any IMRN, and a Continue message is issued directly to the GMSC. Upon receipt of the Continue message, the GMSC proceeds with the subsequent call, in other words, the GMSC sends an SRI message to the HLR to obtain the routing information for the called subscriber, here, this SRI message sent by the GMSC carries a suppress T-CSI parameter. Then, the GMSC routes the call to a VMSC for the called subscriber for connecting in accordance with the routing information for the called subscriber returned from the HLR.

A flow diagram illustrating that a call is routed to the IMS domain and triggered to an anchoring point AS for anchoring in accordance with an analysis of the called number in the CS domain or a PSTN network, with a CS domain or PSTN subscriber acting as the calling subscriber and an MSISDN subscriber in the IMS domain acting as the called subscriber, according to the invention is as illustrated in FIG. 3.

In FIG. 3, in the step 3-1, because an MSISDN of the called subscriber belongs to the IMS domain, the CS domain or a PSTN network initiating the call routes the call to the MGCF in the home IMS domain of the called subscriber.

In the step 3-2, the MGCF converts the MSISDN into TEL URI format and sends to the I-CSCF an INVITE message, in which the called party information Request-URI is in the TEL URI format of the called MSISDN.

The subsequent processing flow is the same as the steps 1-2 to 1-11 except that when the GMSC sends again an IDP message to the gsmSCF with the DSF function in the step 3-11 after the HLR returns in an SRI acknowledge message to the GMSC the T-CSI of the called party, which indicates that the subscriber is a CS-IMS subscriber, the GMSC needs to have the routing-controlled information, such as the CSRN in the received IAM message, carried in a parameter of original called number information of the IDP message to be sent to the gsmSCF with the DSF function, so as to request a routing indication from the gsmSCF with the DSF function.

In the step 3-12, the gsmSCF with the DSF function determines that the present call has been subject to routing control in accordance with the CSRN from original called address information in the IDP message. In other words, for the static anchoring solution, the present call is one subjected to static anchoring control and thus is allocated to without any IMRN, and a Continue message is issued directly to the GMSC. Upon receipt of the Continue message, the GMSC proceeds with the subsequent call, in other words, the GMSC sends an SRI message to the HLR to obtain the routing information for the called subscriber, here, this SRI message sent by the GMSC carries a suppress T-CSI parameter. Then, the GMSC routes the call to a VMSC for the called subscriber for connecting in accordance with the routing information for the called subscriber returned from the HLR.

In a second method, the GMSC controls the subsequent call flow upon determination of that the call has been subject to routing control. An implementation thereof is as follows.

Firstly, the GMSC performs determination on information of called party in a received IAM message. If determining that the information of called party in the IAM message complies with the construction of a CSRN, the GMSC determines that the present call has been subject to routing control, in other words, for the static anchoring solution, the present call is one subjected to static anchoring control.

Thereafter, the GMSC obtains an MSISDN of the original called subscriber by parsing the CSRN and sends an SRI message to the HIR on the basis of the obtained MSISDN, here, the process flow by the GMSC is enhanced according to the invention, in other words, when the GMSC sends an SRI message to the HIR on the basis of the MSISDN of the original called subscriber recovered from the CSRN, the GMSC sends the SRI message to the HLR to obtain routing information for the called subscriber, with this SRI message sent by the GMSC carrying a suppress T-CSI parameter.

Thus, the HLR does not return any T-SCI to the GMSC subsequently but returns directly routing information for the called subscriber, i.e. MSRN, to the GMSC, and the GMSC routes the call to a VMSC for the called subscriber for connecting in accordance with the MSRN returned from the HLR.

In the second method, a CS domain call terminating system includes a routing-controlled determination module and a subsequent call flow control module. Both the routing-controlled determination module and the subsequent call flow control module are located in the GMSC.

Primary functions of the subsequent call flow control module are implemented by a routing information obtainment sub-module and a call routing sub-module.

The routing-controlled determination module is primarily adapted to notify, upon receiving an IAM message of an incoming call, which carries a CSRN, and determining that the call has been subject to routing control in accordance with the CSRN carried in the IAM message, the subsequent call flow control module of the fact that the present call has been subject to routing control, and request the subsequent call flow control module to process the call.

The routing information obtainment sub-module is primarily adapted to obtain, upon receipt of the routing-controlled notification from the routing-controlled determination module, an MSISDN of the original called subscriber by parsing the CSRN by means of a predetermined conversion technology, send an SRI message to the HLR on the basis of the obtained MSISDN, with a suppress T-CSI parameter carried in the SRI message, and then send the routing information of the called subscriber MSRN returned from the HLR to the call routing sub-module upon receipt of the MSRN.

The call routing sub-module is primarily adapted to route the call to a VMSC for the called subscriber in accordance with the received routing information MSRN.

Figure 4:
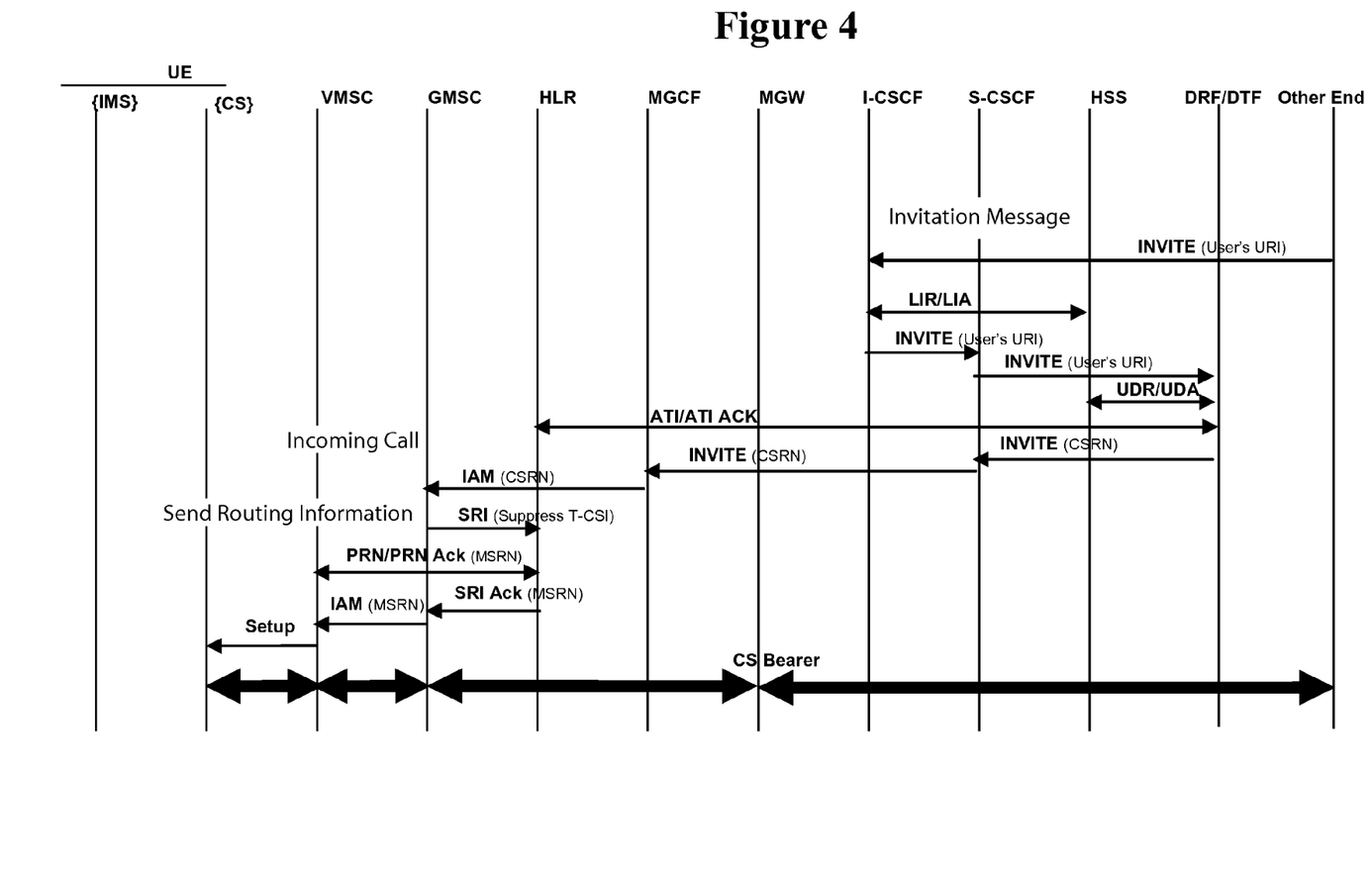
FIG. 4 is a second flow diagram of a method in which an S-CSCF of the called party in the IMS domain triggers an incoming session to an AS for anchoring through an iFC, with an IMS subscriber roaming in the CS domain acting as the called party, according to the embodiment of the invention.
Figure 5:
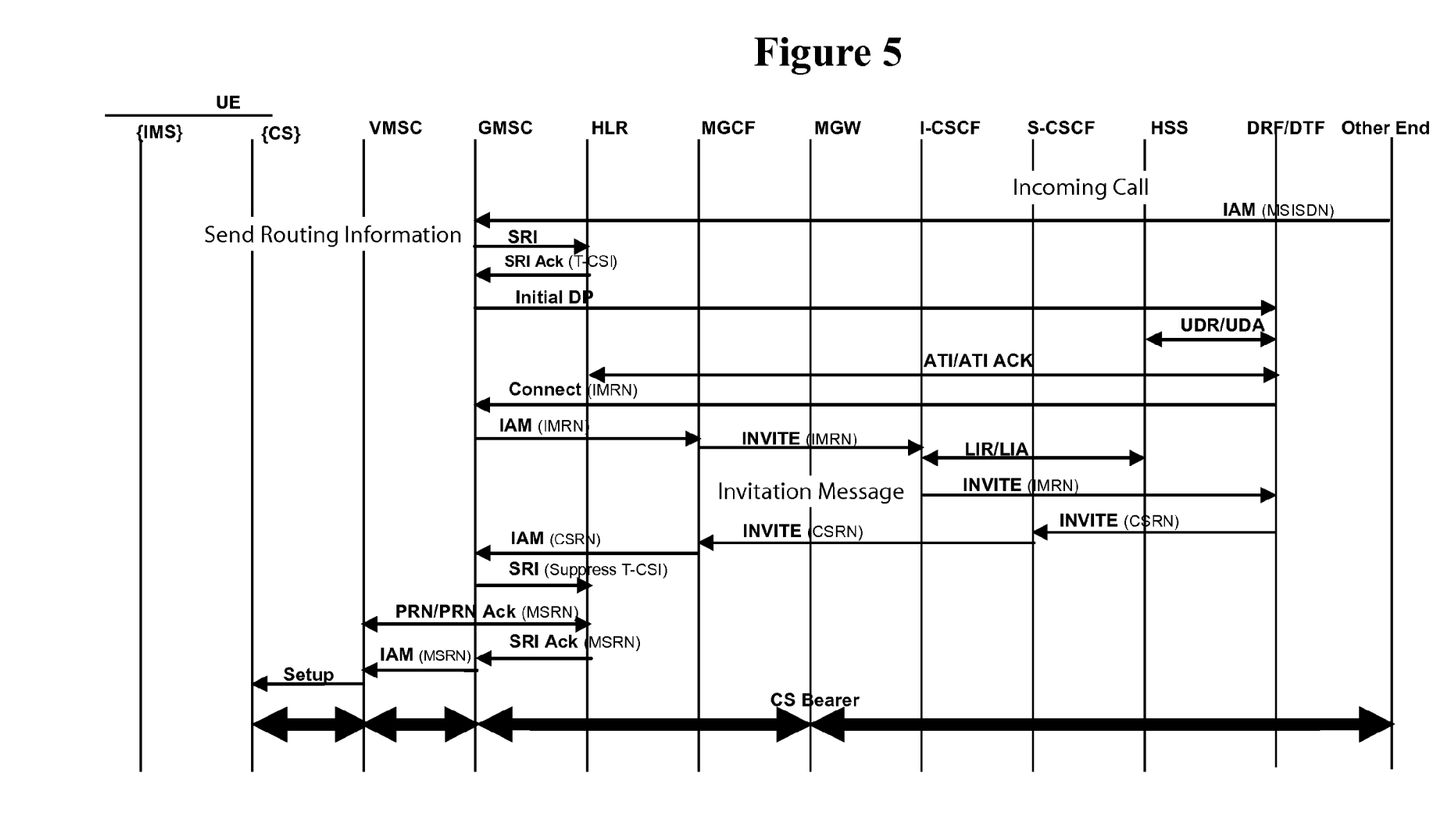
FIG. 5 is a second flow diagram of triggering a call received from the calling party to an anchoring point AS for anchoring by means of a CAMEL mechanism in the CS domain, with a CS domain subscriber acting as the called party, according to the embodiment of the invention.
Figure 6:
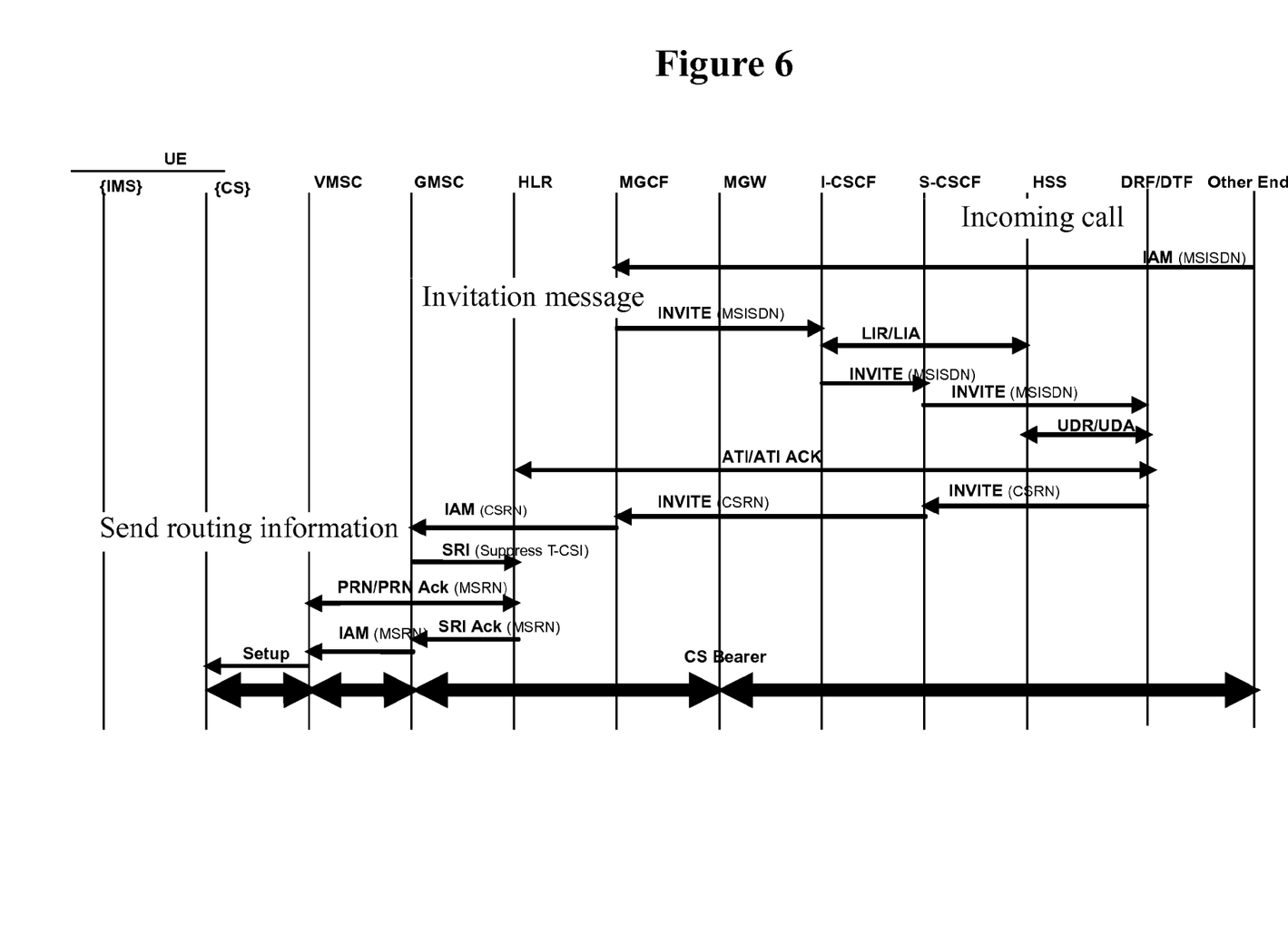
FIG. 6 is a second flow diagram illustrating that a call is routed to the IMS domain and triggered to an anchoring point AS for anchoring in accordance with an analysis of the called number in the CS domain or a PSTN network, with a CS domain or PSTN subscriber acting as the calling subscriber and an MSISDN subscriber in the IMS domain acting as the called subscriber, according to the embodiment of the invention.

An anchoring procedure of a CS call terminating flow in which the second method of the invention is integrated in the static anchoring solution is as illustrated in FIGS. 4 to 6.

A flow diagram illustrating that a calling subscriber in the IMS domain initiates a session to the called subscriber in the IMS domain and an S-CSCF of the called party in the IMS domain triggers the incoming session to an AS for anchoring through an iFC when the called subscriber from the IMS domain roams in the CS domain, according to the invention, is as illustrated in FIG. 4.

In FIG. 4, the flow in the steps 4-1 to 4-8 is substantially the same as the flow in the steps 1-1 to 1-8 in FIG. 1, except that in the step 4-9, the GMSC, upon receipt of the IAM message of the incoming call from the MGCF, obtains an MSISDN of the original called subscriber by parsing the IAM message by means of an intelligent service or other conversation technologies.

On the basis of the event that the called information in the IAM message is the CSRN, the GMSC can know that the present call has been subject to routing control, in other words, for the static anchoring solution, the present call is one subjected to static anchoring control, therefore, when the GMSC sends an SRI message to the HLR on the basis of the obtained MSISDN, a suppress T-CSI parameter needs to be carried in the SRI message.

Thus, the HLR returns routing information for the MSISDN, i.e. MSRN, to the GMSC directly via an SRI ACK message, so that the GMSC can route the call to a VMSC for the called subscriber for connecting in accordance with the MSRN.

A flow diagram of triggering a call received from the calling party to an anchoring point AS for anchoring by means of a CAMEL mechanism in the CS domain, with a CS domain subscriber acting as the called party, according to the invention, is as illustrated in FIG. 5.

In FIG. 5, the flow in the steps 5-1 to 5-13 is substantially the same as the flow in the steps 2-1 to 2-13 in FIG. 2, except that in the step 5-14, the GMSC, upon receipt of the IAM message of the incoming call from the MGCF, obtains an MSISDN of the original called subscriber by parsing the IAM message by means of an intelligent service or other conversation technologies. On the basis of the event that the called information in the IAM message is CSRN, the GMSC can know that the present call has been subject to routing control, in other words, for the static anchoring solution, the present call is one subjected to static anchoring control, therefore, when the GMSC sends an SRI message to the HLR on the basis of the obtained MSISDN, a suppress T-CSI parameter needs to be carried in the SRI message.

Thus, the HLR returns routing information for the MSISDN, i.e. MSRN, to the GMSC directly via an SRI ACK message, so that the GMSC can route the call to a VMSC for the called subscriber for connecting in accordance with the MSRN.

A flow diagram illustrating that a call is routed to the IMS domain and triggered to an anchoring point AS for anchoring in accordance with an analysis of the called number in the CS domain or a PSTN network, with a CS domain or PSTN subscriber acting as the calling subscriber and an MSISDN subscriber in the IMS domain acting as the called subscriber, according to the invention, is as illustrated in FIG. 6.

In FIG. 6, the flow in the steps 6-1 to 6-9 is substantially the same as the flow in the steps 3-1 to 3-9 in FIG. 3, except that in the step 6-9, the GMSC, upon receipt of the IAM message of the incoming call from the MGCF, obtains an MSISDN of the original called subscriber by parsing the IAM message by means of an intelligent service or other conversation technologies. On the basis of the event that the called information in the IAM message is CSRN, the GMSC can know that the present call has been subject to routing control, in other words, for the static anchoring solution, the present call is one subjected to static anchoring control, therefore, when the GMSC sends an SRI message to the HLR on the basis of the obtained MSISDN, a suppress T-CSI parameter needs to be carried in the SRI message.

Thus, the HLR returns routing information for the MSISDN, i.e. MSRN, to the GMSC directly via an SRI ACK message, so that the GMSC can route the call to a VMSC for the called subscriber for connecting in accordance with the MSRN.

The network device according to the invention is as described with reference to the above system and descriptions thereof are omitted.

Although the invention has been described with reference to the embodiments, those ordinarily skilled in the art shall appreciate that numerous variations and changes can be made to the invention without departing from the principles of the invention. All such variations and changes, and all foreseeable equivalents to the elements of the invention described with reference to FIGS. 1-6, are intended to fall within the scope of the appended claims.

The invention claimed is:

1. A Circuit Switched domain call routing method, comprising:
    receiving, by a GMSC, routing-controlled information of a call carried in a call initiation message;
    indicating, by the GMSC, that the call has been subject to routing control by sending the routing-controlled information of the call to a gsmSCF;
    determining, by the gsmSCF, that the call has been subject to routing control in accordance with the routing-controlled information;
    sending, by the gsmSCF, a Continue message to the GMSC directly after the gsmSCF determines that the call has been subject to routing control; and
    sending, by the GMSC, to an HLR an SRI message carrying a suppress T-CSI parameter upon receipt of the Continue message;
    wherein the routing-controlled information is a CSRN, the method further comprising, before the step of indicating:
    triggering, by the GMSC, an intelligent service for the CSRN on the basis of N-CSI configured beforehand at the GMSC.

2. The method according to claim 1, wherein the call initiation message is an IAM message, and the sending the routing-controlled information of the call to a gsmSCF comprises:
    carrying the CSRN from the IAM message in an IDP message;
    sending the IDP message to the gsmSCF.

3. The method according to claim 1, further comprising providing anchoring control of the call or a corresponding call session in a network entity comprising the gsmSCF.

4. The method according to claim 1, further comprising providing IMS anchoring control of the call or a corresponding call session, or anchoring control of the call or a corresponding call session by means of a CAMEL mechanism.

5. The method according to claim 1, further comprising:
    sending, by the GMSC, another SRI message to the HLR;
    receiving, by the GMSC, a T-CSI of the called party of the call.

6. The method according to claim 1, wherein the step of triggering an intelligent service comprises:
    receiving, by the gsmSCF, an IDP message containing the CSRN;
    obtaining, by the gsmSCF, an MSISDN of the call by parsing the CSRN; and sending, by the gsmSCF, the MSISDN to the GMSC by means of a CONNECT operation.

7. A network device, comprising a GMSC, wherein the GMSC is configured for performing all the method steps of the GMSC in claim 1.

8. A network device, comprising a gsmSCF, wherein the gsmSCF is configured for performing all the method steps of the gsmSCF in claim 1.

9. A Circuit Switch domain call routing system, comprising:
   a GMSC; and
   a gsmSCF;
   wherein the GMSC is configured to receive routing-controlled information of a call carried in a call initiation message, and to indicate that the call has been subject to routing control by sending the routing-controlled information of the call to the gsmSCF, wherein the routing-controlled information is a CSRN;
   wherein triggering, by the GMSC, is further configured to trigger, an intelligent service for the CSRN on the basis of N-CSI configured beforehand at the GMSC;
   wherein the gsmSCF is configured to determine that the present call has been subject to routing control upon receipt of an Initial Detection Point message carrying the routing-controlled information, and to issue a Continue message directly to the GMSC for circuit switch domain interworking; and
   wherein the GMSC is further configured to send to a home location register (HLR) a Sending Routing Information message carrying a suppress Terminating-CAMEL Subscription Information (T-CSI) parameter upon receipt of the Continue message, and to route the call to a VMSC for a called subscriber for connecting in accordance with routing information for the called subscriber, a Mobile Station Roaming Number (MSRN) returned from the HLR.

10. The system according to claim 9, wherein the GMSC is located in a network entity for circuit switch domain interworking.

11. The system according to claim 10, wherein the network entity for CS domain interworking comprises a Gateway Mobile Switching Center, GMSC, or a Media Gateway Control Function, MGCF, with the function of a GMSC.

12. The system according to claim 9, wherein the GMSC comprises a routing information obtainment sub-module and a call routing sub-module, wherein the routing information obtainment sub-module is adapted to:
   obtain number information of an original called subscriber by parsing a CSRN carried in the call initiation message upon receipt of the routing-controlled information,
   send to an HLR an SRI message carrying a suppress T-CSI parameter in accordance with the number information of the original called subscriber, and
   send, upon receipt of routing information for the called subscriber returned from the HLR, the routing information to the call routing sub-module; and
   the call routing sub-module is adapted to route the call to a VMSC for the called subscriber in accordance with the routing information sent from the routing information obtainment sub-module.

13. A Circuit Switch domain call routing system comprising:
   a GMSC; and
   a gsmSCF;
   wherein the GMSC is configured to receive routing-controlled information of a call carried in a call initiation message, and to indicate that the call has been subject to routing control by sending the routing-controlled information of the call to the gsmSCF, wherein the routing-controlled information is a CSRN and wherein the GMSC is further configured to trigger, an intelligent service for the CSRN on the basis of N-CSI configured beforehand at the GMSC;
   wherein the gsmSCF is configured to determine that the call has been subject to routing control in accordance with the routing-controlled information, and then to directly send a Continue message to the GMSC, and
   wherein the GMSC is further configured to send to an HLR an SRI message carrying a suppress T-CSI parameter upon receipt of the Continue message.

* * * * *